(12) United States Patent
Ishida et al.

(10) Patent No.: US 10,827,201 B2
(45) Date of Patent: *Nov. 3, 2020

(54) VIDEO ENCODING METHOD, VIDEO ENCODING DEVICE, VIDEO DECODING METHOD, VIDEO DECODING DEVICE, PROGRAM, AND VIDEO SYSTEM

(71) Applicant: NEC CORPORATION, Tokyo (JP)

(72) Inventors: Takayuki Ishida, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/824,778

(22) Filed: Mar. 20, 2020

(65) Prior Publication Data

US 2020/0221132 A1 Jul. 9, 2020

Related U.S. Application Data

(63) Continuation of application No. 15/777,980, filed as application No. PCT/JP2016/083681 on Nov. 14, 2016, now Pat. No. 10,645,421.

(30) Foreign Application Priority Data

Dec. 2, 2015 (JP) .................................. 2015-235525

(51) Int. Cl.
*H04N 19/70* (2014.01)
*H04N 19/114* (2014.01)
(Continued)

(52) U.S. Cl.
CPC ........... *H04N 19/70* (2014.11); *H04N 19/103* (2014.11); *H04N 19/114* (2014.11);
(Continued)

(58) Field of Classification Search
None
See application file for complete search history.

(56) References Cited

U.S. PATENT DOCUMENTS

2015/0010059 A1   1/2015  Hattori et al.
2018/0070083 A1*  3/2018  Tsukagoshi ........ H04N 21/2362

FOREIGN PATENT DOCUMENTS

JP    2007257641 A    10/2007
JP    2008118221 A     5/2008
(Continued)

OTHER PUBLICATIONS

Association of Radio Industries and Businesses, "Video Coding, Audio Coding and Multiplexing Specifications for Digital Broadcasting", ARIB STD-B32, 3.0 edition, Jul. 31, 2014, pp. 43 to 44, 140 to 142.

(Continued)

*Primary Examiner* — Dakshesh D Parikh
(74) *Attorney, Agent, or Firm* — Sughrue Mion, PLLC

(57) ABSTRACT

In a video encoding device, a transmission section sets a value corresponding to characteristics specified by ITU-R BT.709 to 1 in the transfer characteristics syntax when the dynamic range of the video signal is a SDR (Standard Dynamic Range), and sets a value corresponding to one of characteristics specified by HLG (Hybrid Log Gamma) to 18 or a value corresponding to one of characteristics specified by PQ (Perceptual Quantizer) to 16 when the dynamic range of the video signal is a HDR (High Dynamic Range).

6 Claims, 12 Drawing Sheets

(51) Int. Cl.
*H04N 19/136* (2014.01)
*H04N 19/103* (2014.01)
*H04N 19/177* (2014.01)
*H04N 19/30* (2014.01)
*H04N 19/31* (2014.01)

(52) U.S. Cl.
CPC ......... *H04N 19/136* (2014.11); *H04N 19/177* (2014.11); *H04N 19/30* (2014.11); *H04N 19/31* (2014.11)

(56) References Cited

FOREIGN PATENT DOCUMENTS

| JP | 2010213360 A | 9/2010 |
|---|---|---|
| JP | 2014534719 A | 12/2014 |
| JP | 2015008361 A | 1/2015 |
| JP | 2016195450 A | 11/2016 |
| JP | 2014178286 A1 | 2/2017 |
| WO | 2015111467 A1 | 7/2015 |
| WO | 2015125719 A1 | 8/2015 |
| WO | 2016/152684 A1 | 9/2016 |

OTHER PUBLICATIONS

Naccari et al., "High dynamic range compatibility information SEI message", Joint Collaborative Team on Video Coding (JCT-VC) of ITU-T SG 16 WP 3 and ISO/IED JTC 1/SC 29/WG 11, JCTVC-U0033, Warsaw, Poland, Jun. 9, 2015, XP030117445, 9 pages total.

"Recommendation ITU-T H.265", ITU-T, Oct. 2014, pp. 65, 341, 347-349 (total 6 pages).

Rajan Joshi et al., "High Efficiency Video Coding (HEVC) Screen Content Coding: Draft 4", Joint Collaborative Team on Video Coding (JCT-VC) of ITU-T SG 16 WP 3 and ISO/IEC JTC 1/SC29/WG 11 21st Meeting: Warsaw, PL, JCTVC-U1005_rl, Jun. 26, 2015, 1, pp. 372 to 374.

Qualcomm Inc., "Dynamic Range Adjustment SEI to enable High Dynamic Range video coding with Backward-Compatible Capability", ITU-T SG16 Meeting, Geneva, No. T13-SG16-C-1027, Sep. 29, 2015, XP030100746, 11 pages.

Extended European Search Report dated Aug. 2, 2019 issued by the European Patent Office in counterpart application No. 16870421.1.

International Search Report of PCT/JP2016/083681 filed Dec. 6, 2016.

Cotton et al., "BBC's response to CfE for HDR Video Coding (Category 3a)", British Broadcasting Corporation, Coding of Moving Pictures and Audio, ISO/IEC JTC1/SC29/WG11 M36249, Warsaw, Poland, Jun. 2015, 22 pages total.

Communication dated Oct. 8, 2019 from Japanese Patent Office in counterpart JP Application No. 2017-179959.

General incorporated foundation Association of Radio Industries and Businesses, "The proposal about the technical condition concerning high definition-ization of a super-high-definition television broadcasting system etc.", information-and-telecommunications council information-and-communication-technology subcommittee The broadcasting system committee (the 52nd time), a HDR fatigue detail (the 52nd time), Nov. 26, 2015.

* cited by examiner (SCREEN DIVISION OF 8K)

VIDEO ENCODING METHOD, VIDEO ENCODING DEVICE, VIDEO DECODING METHOD, VIDEO DECODING DEVICE, PROGRAM, AND VIDEO SYSTEM

CROSS REFERENCE TO RELATED APPLICATIONS

This application is a Continuation of U.S. application Ser. No. 15/777,980 filed May 22, 2018, which is a National Stage of International Application No. PCT/JP2016/083681 filed Nov. 14, 2016, claiming priority based on Japanese Patent Application No. 2015-235525 filed Dec. 2, 2015, the entire contents of all of which are hereby incorporated by reference.

TECHNICAL FIELD

The present invention relates to a video encoding method, a video encoding device, a video decoding method, a video decoding device, a program, and a video system.

BACKGROUND ART

In response to demand for video of higher resolutions, Full HD (High Definition) video content of horizontal 1920×vertical 1080 (pixels) has been provided. In addition, test broadcasting and commercial broadcasting of high-definition video of horizontal 3840×vertical 2160 (pixels) (hereafter referred to as "4K") have been started. Furthermore, commercial broadcasting of high-definition video of horizontal 7680×vertical 4320 (pixels) (hereafter referred to as "8K") has been planned.

In a video content distribution system, typically, a transmitter encodes a video signal based on the H.264/AVC (Advanced Video Coding) standard or the HEVC (High Efficiency Video Coding) standard, and a receiver performs a decoding process to reproduce the video signal. In 8K, the processing load in the encoding process and the decoding process is high due to a large number of pixels.

As a method for reducing the processing load in 8K, for example, Non Patent Literature (NPL) 1 describes screen 4-division encoding using slices (see FIG. 11). As depicted in FIG. 12, according to NPL 1, in the case where screen 4-division encoding is used, a motion vector for motion compensation (MC) in a block near a boundary between two slices (a slice boundary) has a constraint that the component in the slice vertical (longitudinal) direction is less than or equal to 128 pixels when performing inter prediction. Meanwhile, a block not belonging to near the slice boundary is not subjected to any constraint (hereafter referred to as "motion vector restriction") of the motion vector range in the vertical direction across the slice boundary.

For 4K or 8K, the use of not only a video signal of standard dynamic range (hereafter referred to as "SDR") but also a video signal of Hybrid Log Gamma (hereafter referred to as "HLG") which is a high dynamic range (hereafter referred to as "HDR") standard of the ARIB STD-B67 standard, Perceptual Quantizer (hereafter referred to as "PQ") which is a HDR standard of the SMPTE (Society of Motion Picture and Television Engineers) ST. 2084 standard, and the like is under study. This makes it necessary to take SDR/HDR switching into consideration.

CITATION LIST

Non Patent Literature

NPL 1: ARIB (Association of Radio Industries and Businesses) standard STD-B32 3.0 edition, Jul. 31, 2014, Association of Radio Industries and Businesses

SUMMARY OF INVENTION

Technical Problem

In the case where there is the motion vector restriction, when encoding a scene in which an object in a screen or the whole screen moves fast in the longitudinal direction, an optimum motion vector may be unable to be selected at a slice boundary. This can result in local image quality degradation. When the M value is larger upon fast movement, the degree of degradation is higher. The M value is a reference picture interval. Here, "optimum motion vector" means a primary (normal) motion vector selected in a predictor that performs an inter prediction (inter-screen prediction) process in a video encoding device.

FIG. 14 depicts a reference picture interval in each of the case where M=4 and the case where M=8. Typically, in the case where the M value is small, the inter-frame distance is short, so that the motion vector value tends to be small. However, particularly in a motionless scene, a number of layers in a temporal direction tends to decrease. Consequently, since the code amount allocation for the layers is constrained, coding efficiency decreases. In the case where the M value is large, on the other hand, the inter-frame distance is long, so that the motion vector value tends to be large. However, particularly in a motionless scene, a number of layers in a temporal direction tends to increase. Consequently, the constraint of the code amount allocation depending on the hierarchy (layer) is relaxed, which results in an increase in coding efficiency. As an example, when the M value is changed from 8 to 4, the motion vector value is reduced to half. When the M value is changed from 4 to 8, the motion vector value is doubled.

NPL 1 introduces a concept of SOP (Set of Pictures). An SOP is a unit describing the encoding order and reference relationship of each AU (Access Unit) in the case of performing temporal scalable encoding (scalable encoding). Temporal scalable encoding is such encoding that enables a frame to be extracted partially from video of a plurality of frames.

As SOP structure, there are a structure of L=0, a structure of L=1, a structure of L=2, and a structure of L=3. As depicted in FIG. 15, Lx (x=0, 1, 2, 3) is the following structure:

Structure of L=0: SOP structure composed of only a picture or pictures whose Temporal ID are 0 (i.e. the number of rows of picture included in the SOP is 1. In other words, L indicating maximum Temporal ID is 0.)

Structure of L=1: SOP structure composed of a picture or pictures whose Temporal ID are 0 and a picture or pictures whose Temporal ID are 1 (i.e. the number of rows of picture included in the SOP is 2. In other words, L indicating maximum Temporal ID is 1.)

Structure of L=2: SOP structure composed of a picture or pictures whose Temporal ID are 0, a picture or pictures whose Temporal ID are 1, and a picture or pictures whose Temporal ID are 2 (i.e. the number of rows of picture included in the SOP is 3. In other words, L indicating maximum Temporal ID is 2.)

Structure of L=3: SOP structure composed of a picture or pictures whose Temporal ID are 0, a picture or pictures whose Temporal ID are 1, a picture or pictures whose Temporal ID are 2, and a picture or pictures whose Temporal ID are 3 (i.e. the number of rows of picture included in the SOP is 4. In other words, L indicating maximum Temporal ID is 3.)

In this description, M=1 corresponds to the SOP structure of L=0, M=2 corresponds to the SOP structure of L=1 in the case where N=1 (see FIG. 15), M=3 corresponds to the SOP structure of L=1 in the case where N=2 (see FIG. 15), M=4 corresponds to the SOP structure of L=2, and M=8 corresponds to the SOP structure of L=3.

For a motionless scene (e.g. a scene in which an object in a screen or the whole screen does not move fast), coding efficiency is higher when the reference picture interval (M value) is larger, as mentioned above. Therefore, to encode high-definition video such as 8K at a low rate, the video encoding device preferably operates basically with M=8.

However, the motion vector value tends to increase if the M value is increased, as mentioned above. Hence, particularly in a scene in which an object in a screen or the whole screen moves fast in the longitudinal direction, image quality degrades due to the motion vector restriction. This is because an optimum motion vector may be unable to be selected at a slice boundary due to the motion vector restriction.

The present invention has an object of preventing image quality degradation in the case of using an encoding method that divides a video screen and then performs compression and in which motion vector selection near a slice boundary is constrained. Since SDR/HDR switching also needs to be taken into consideration in 4K or 8K as mentioned earlier, the present invention has an object of preventing image quality degradation while also taking SDR/HDR switching into consideration.

Solution to Problem

A video encoding method according to the present invention is a video encoding method for appropriately selecting a scalable encoding structure from a plurality of scalable encoding structures to generate a bitstream, using dynamic range-related video signal information, the video encoding method including using the scalable encoding structure capable of transmitting the dynamic range-related video signal information for switching a dynamic range, when a video signal to be encoded is switched from an SDR (a standard dynamic range) signal to an HDR (a high dynamic range) signal or switched from the HDR signal to the SDR signal in a temporal direction.

A video encoding device according to the present invention is a video encoding device for appropriately selecting a scalable encoding structure from a plurality of scalable encoding structures to generate a bitstream, using dynamic range-related video signal information, the video encoding device including an encoding section for selecting the scalable encoding structure capable of transmitting the dynamic range-related video signal information for switching a dynamic range, when a video signal to be encoded is switched from an SDR (a standard dynamic range) signal to an HDR (a high dynamic range) signal or switched from the HDR signal to the SDR signal in a temporal direction.

A video encoding program according to the present invention is a video encoding program for causing a computer in a video encoding device for appropriately selecting a scalable encoding structure from a plurality of scalable encoding structures to generate a bitstream using dynamic range-related video signal information, to execute a process of using the scalable encoding structure capable of transmitting the dynamic range-related video signal information for switching a dynamic range, when a video signal to be encoded is switched from a standard dynamic range (SDR) to a high dynamic range (HDR) or switched from the HDR to the SDR in a temporal direction.

A video decoding method according to the present invention is a video decoding method for obtaining video by decoding a bitstream generated by appropriately selecting a scalable encoding structure from a plurality of scalable encoding structures using dynamic range-related video signal information, the video decoding method including obtaining the video from the bitstream generated using the scalable encoding structure capable of transmitting the dynamic range-related video signal information for switching a dynamic range when a video signal to be encoded is switched from a standard dynamic range (SDR) to a high dynamic range (HDR) or switched from the HDR to the SDR in a temporal direction.

A video decoding device according to the present invention is a video decoding device for obtaining video by decoding a bitstream generated by appropriately selecting a scalable encoding structure from a plurality of scalable encoding structures using dynamic range-related video signal information, the video decoding device including a decoding section for obtaining the video from the bitstream generated using the scalable encoding structure capable of transmitting the dynamic range-related video signal information for switching a dynamic range when a video signal to be encoded is switched from a standard dynamic range (SDR) to a high dynamic range (HDR) or switched from the HDR to the SDR in a temporal direction.

A video decoding program according to the present invention is a video decoding program for causing a computer in a video decoding device for obtaining video by decoding a bitstream generated by appropriately selecting a scalable encoding structure from a plurality of scalable encoding structures using dynamic range-related video signal information, to execute a process of obtaining the video from the bitstream generated using the scalable encoding structure capable of transmitting the dynamic range-related video signal information for switching a dynamic range when a video signal to be encoded is switched from a standard dynamic range (SDR) to a high dynamic range (HDR) or switched from the HDR to the SDR in a temporal direction.

A video system according to the present invention is a video system including: the above-mentioned video encoding device; an audio encoding section for encoding an audio signal; and a multiplexing section for multiplexing a bitstream from the video encoding device and a bitstream from the audio encoding section, and outputting a resulting multiplexed bitstream.

Advantageous Effects of Invention

According to the present invention, image quality degradation can be prevented while responding to SDR/HDR switching.

DESCRIPTION OF EMBODIMENT

Example embodiments of the present invention are described below, with reference to drawings.

Figure 1:
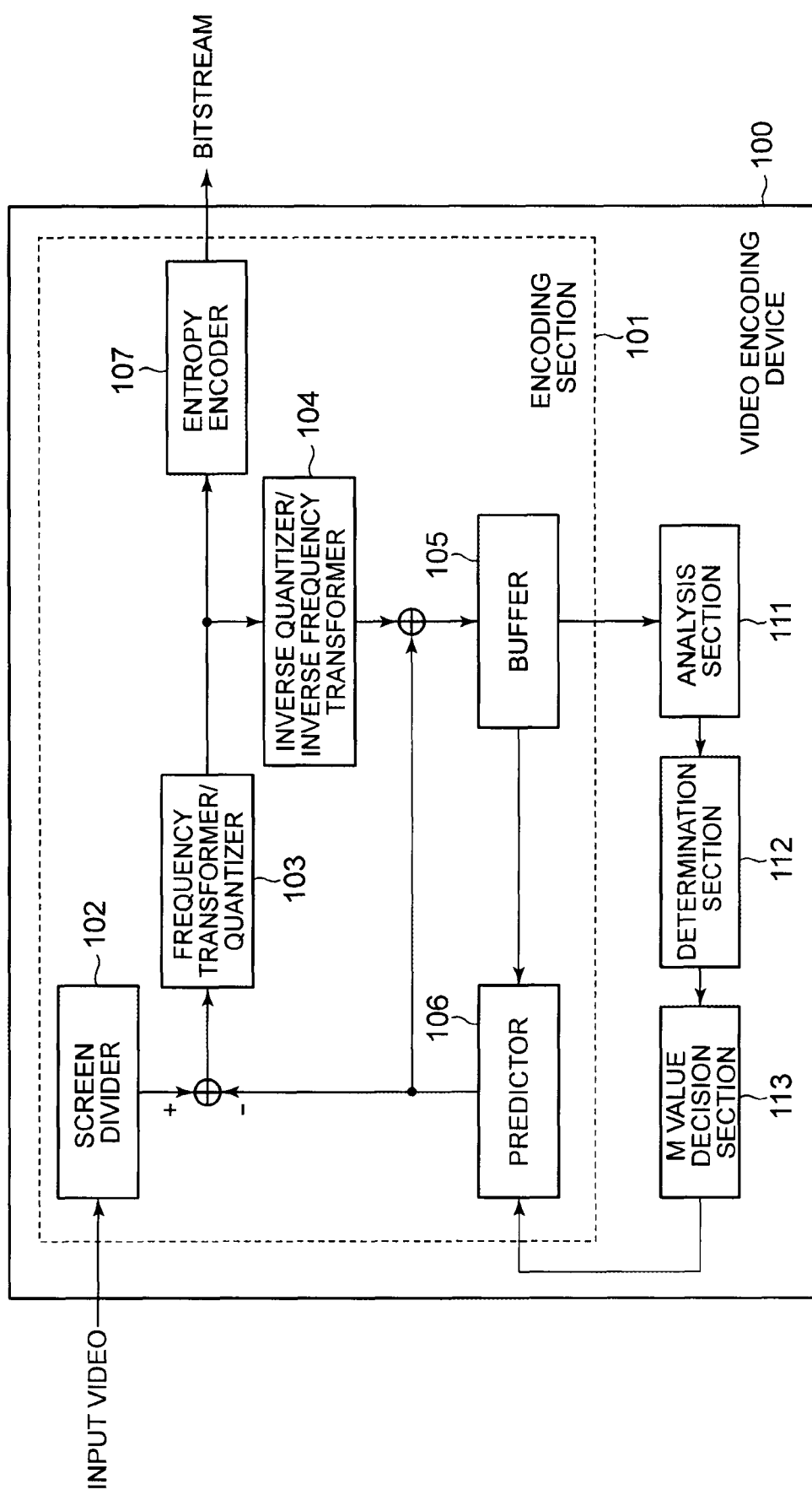
FIG. 1 is a block diagram depicting a structural example of an example embodiment of a video encoding device.

FIG. 1 is a block diagram depicting a structural example of an example embodiment of a video encoding device. A video encoding device 100 depicted in FIG. 1 includes an encoding section 101, an analysis section 111, a determination section 112, and an M value decision section 113. Although the video encoding device 100 performs an encoding process based on the HEVC standard, the encoding process may be performed based on another standard, such as the H.264/AVC standard. The following describes an example where 8K video is input.

The encoding section 101 includes a screen divider 102 for dividing an input image into a plurality of screens, a frequency transformer/quantizer 103, an inverse quantizer/inverse frequency transformer 104, a buffer 105, a predictor 106, and an entropy encoder 107.

Figure 11:
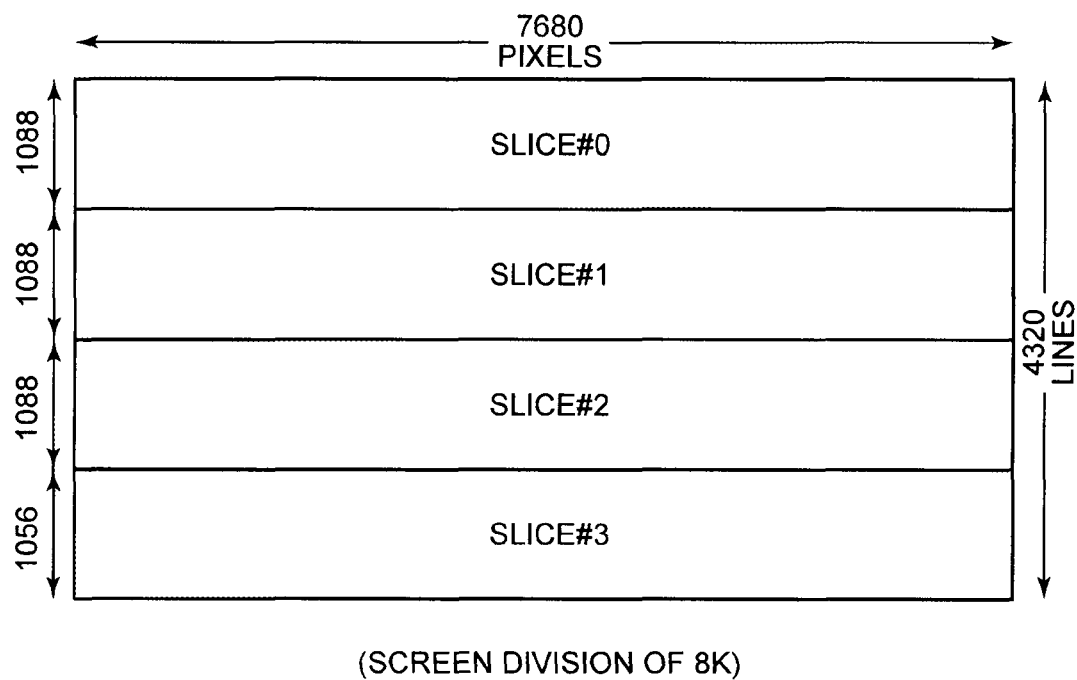
FIG. 11 is an explanatory diagram depicting an example of screen division.

The screen divider 102 divides an input video screen into four screens (see FIG. 11). The frequency transformer/quantizer 103 frequency-transforms a prediction error image obtained by subtracting a prediction signal from the input video signal. The frequency transformer/quantizer 103 further quantizes the frequency-transformed prediction error image (frequency transform coefficient). The quantized frequency transform coefficient is hereafter referred to as "transform quantization value".

The entropy encoder 107 entropy-encodes prediction parameters and the transform quantization value, and outputs a bitstream. The prediction parameters are information related to CTU (Coding Tree Unit) and block prediction, such as a prediction mode (intra prediction, inter prediction), an intra prediction block size, an intra prediction direction, an inter prediction block size, and a motion vector.

The predictor 106 generates the prediction signal for the input video signal. The prediction signal is generated based on intra prediction or inter-frame prediction.

The inverse quantizer/inverse frequency transformer 104 inverse-quantizes the transform quantization value. The inverse quantizer/inverse transformer 104 further inverse-frequency-transforms the frequency transform coefficient obtained by the inverse quantization. The prediction signal is added to the reconstructed prediction error image obtained by the inverse frequency transform, and the result is supplied to the buffer 105. The buffer 105 stores the reconstructed image.

The analysis section 111 analyzes encoding statistical information. The determination section 112 determines whether or not an optimum motion vector is selectable near a slice boundary with the above-mentioned motion vector restriction, based on the result of analysis by the analysis section 111. The encoding statistical information is information of an encoding result of a past frame (e.g. a frame immediately preceding a current frame to be encoded). A specific example of the encoding statistical information will be described later.

Here, "near a slice boundary" is a region in which an optimum motion vector cannot be selected. When realizing the below-mentioned control, for example, "near a slice boundary" may be set as the range of ±128 pixels from the slice boundary or the range of ±256 pixels from the slice boundary, for convenience's sake. Moreover, when realizing the below-mentioned control, the range of "near a slice boundary" may be changed as appropriate depending on the state of video (e.g. large/small movement). As an example, the range of "near a slice boundary" may be set to be wide in the case where the generation ratio of motion vectors large in value is high.

The M value decision section 113 adaptively decides the M value, based on the result of determination by the determination section 112. Deciding the M value is equivalent to deciding the Lx (x=0, 1, 2, 3) structure in the SOP structure, as mentioned earlier. The encoding statistical information will be described later.

Figure 2:
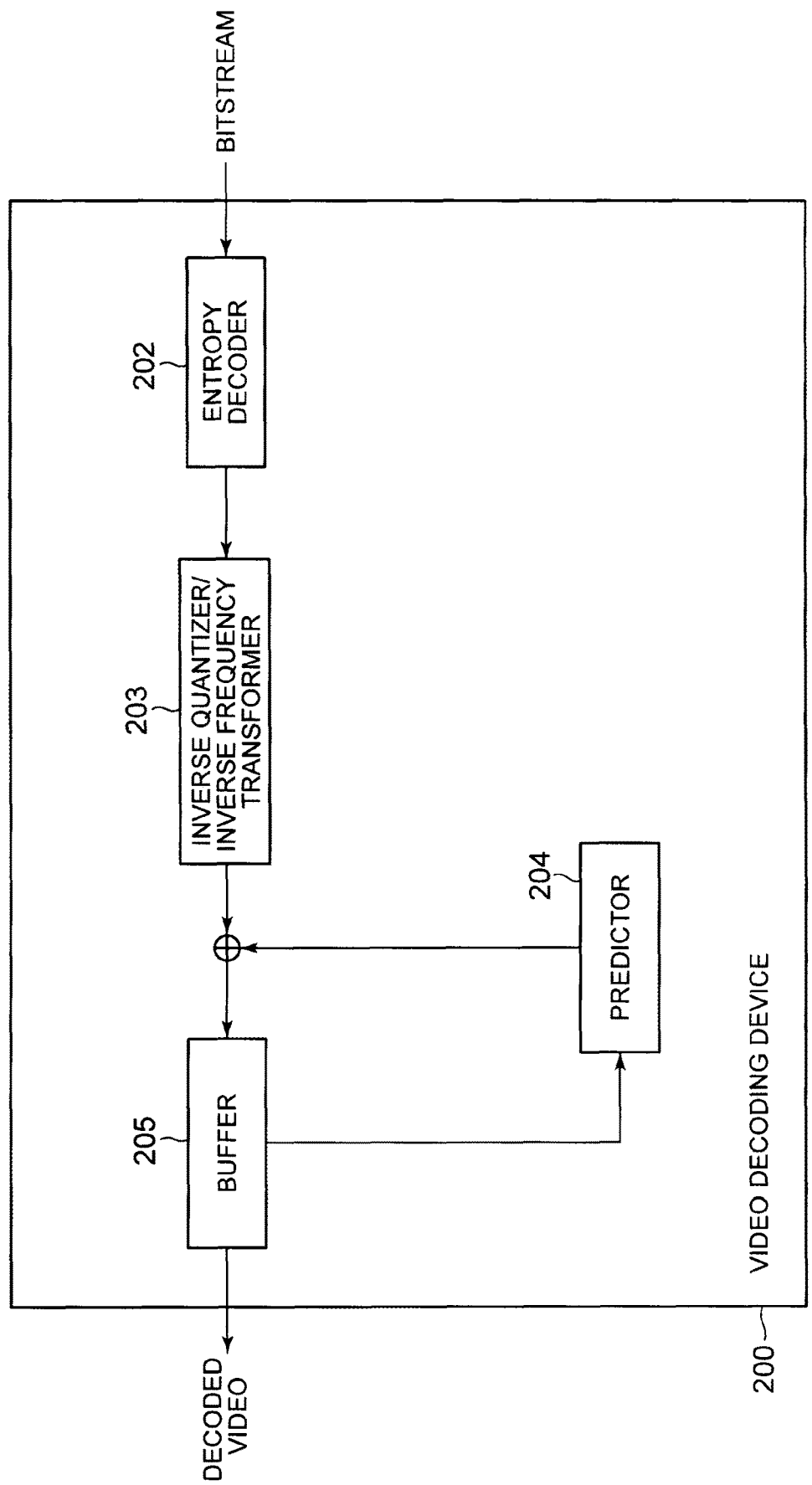
FIG. 2 is a block diagram depicting a structural example of an example embodiment of a video decoding device.

FIG. 2 is a block diagram depicting a structural example of an example embodiment of a video decoding device. A video decoding device 200 depicted in FIG. 2 includes an entropy decoder 202, an inverse quantizer/inverse frequency transformer 203, a predictor 204, and a buffer 205.

The entropy decoder 202 entropy-decodes the bitstream of video. The entropy decoder 202 supplies the entropy-decoded transform quantization value to the inverse quantizer/inverse frequency transformer 203.

The inverse quantizer/inverse frequency transformer 203 inverse-quantizes the transform quantization value of luminance and color difference with a quantization step size, to obtain the frequency transform coefficient. The inverse quantizer/inverse frequency transformer 203 further inverse-frequency-transforms the frequency transform coefficient obtained by the inverse quantization.

After the inverse frequency transform, the predictor 204 generates a prediction signal using an image of a reconstructed picture stored in the buffer 205 (the prediction is also referred to as "motion compensation prediction" or "MC reference"). The prediction signal supplied from the predictor 204 is added to the reconstructed prediction error image obtained by the inverse frequency transform by the inverse quantizer/inverse frequency transformer 203, and the result is supplied to the buffer 205 as a reconstructed picture. The reconstructed picture stored in the buffer 205 is then output as decoded video.

The operations of the analysis section 111, the determination section 112, and the M value decision section 113 in the video encoding device 100 are described below.

Example Embodiment 1

Figure 3:
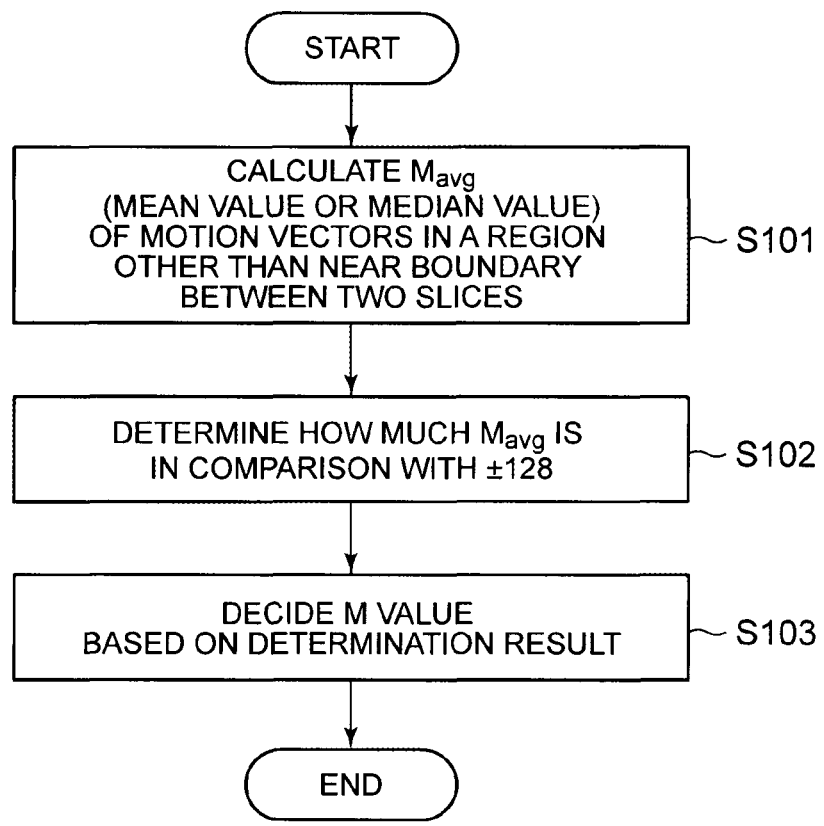
FIG. 3 is a flowchart depicting operation in example embodiment 1 of the video encoding device.

FIG. 3 is a flowchart depicting operation in example embodiment 1 of the video encoding device 100 depicted in FIG. 1. In example embodiment 1, it is assumed that 8K video is divided into four (see FIG. 11), and there is a motion vector restriction near a slice boundary. As the motion vector restriction, ±128 is used as an example. The case where 8K video is divided into four and there is a motion vector restriction also applies to the other example embodiments. An initial value of the M value is 8 (M=8).

The analysis section 111 analyzes the past encoding result (e.g. the encoding result of the immediately preceding frame) stored in the buffer 105. In detail, the analysis section 111 calculates the mean value or median value of the motion vectors in the blocks other than the slice boundary (the mean value or median value is hereafter denoted as $M_{avg}$) (step S101). In example embodiment 1, the encoding statistical information is the motion vector values, and the analysis result is the mean value or median value of the motion vectors.

The determination section 112 determines how much $M_{avg}$ is in comparison with ±128 as the motion vector restriction (step S102).

The M value decision section 113 decides the M value, based on the result of determination of the magnitude of $M_{avg}$ (step S103).

For example, the M value decision section 113 decides the M value based on the determination result, in the following manner.

(1) In the case where M=8:
$|M_{avg}|≤128→$maintain M=8
$128<|M_{avg}|≤256→$decide M=4 (½ of M=8)
$256<|M_{avg}|≤512→$decide M=2 (¼ of M=8)
$512<|M_{avg}|→$decide M=1 (⅛ of M=8).

(2) In the case where M=4:
$|M_{avg}|≤64→$decide M=8
$64<|M_{avg}|≤128→$maintain M=4
$128<|M_{avg}|≤256→$decide M=2
$256<|M_{avg}|→$decide M=1.

In the case where the M value is any other value, too, the M value decision section 113 returns the M value to 8 if it can be estimated that, when setting the M value to 8, the motion vector value near the slice boundary is within ±128 under the motion vector restriction, as in the foregoing cases (1) and (2). In other words, the M value decision section 113 returns the M value to 8, in the case where it can be estimated that an optimum motion vector is selectable near the slice boundary under the motion vector restriction. In other cases, too, the M value decision section 113 decides the M value so that the motion vector value near the slice boundary is within ±128, depending on $M_{avg}$.

The above-mentioned case analysis (threshold setting) is an example, and the thresholds may be changed or finer cases may be set.

The control of the video encoding device in example embodiment 1 is based on the following concept.

When the video is video of a scene in which the whole screen moves fast, the ratio in number of motion vectors large in value is high in both the region near the slice boundary and the region other than near the slice boundary, with respect to all generated motion vectors. However, due to the motion vector restriction, there is a possibility that an optimum motion vector is not selected near the slice boundary. Accordingly, the determination section 112 estimates whether or not the screen to be encoded is a video screen of a fast moving scene, based on motion vectors (which are normal, i.e. optimum, motion vectors because there is no motion vector restriction) as encoding statistical information generated in the region other than the slice boundary. In the case where the determination section 112 estimates that the video is video of a fast moving scene, the M value decision section 113 changes the M value so that an optimum motion vector is selectable near the slice boundary.

In the case where the video is video of a fast moving scene, there is a possibility that an optimum motion vector is not selected near the slice boundary. Hence, estimating that the video is video of a fast moving scene is equivalent to estimating that an optimum motion vector is not selected near the slice boundary under the motion vector restriction.

The M value and the SOP structure correlate with each other, as mentioned earlier. Hence, deciding the M value by the M value decision section 113 is equivalent to deciding the SOP structure (i.e. Lx (x=0, 1, 2, 3) structure).

Example Embodiment 2

Figure 4:
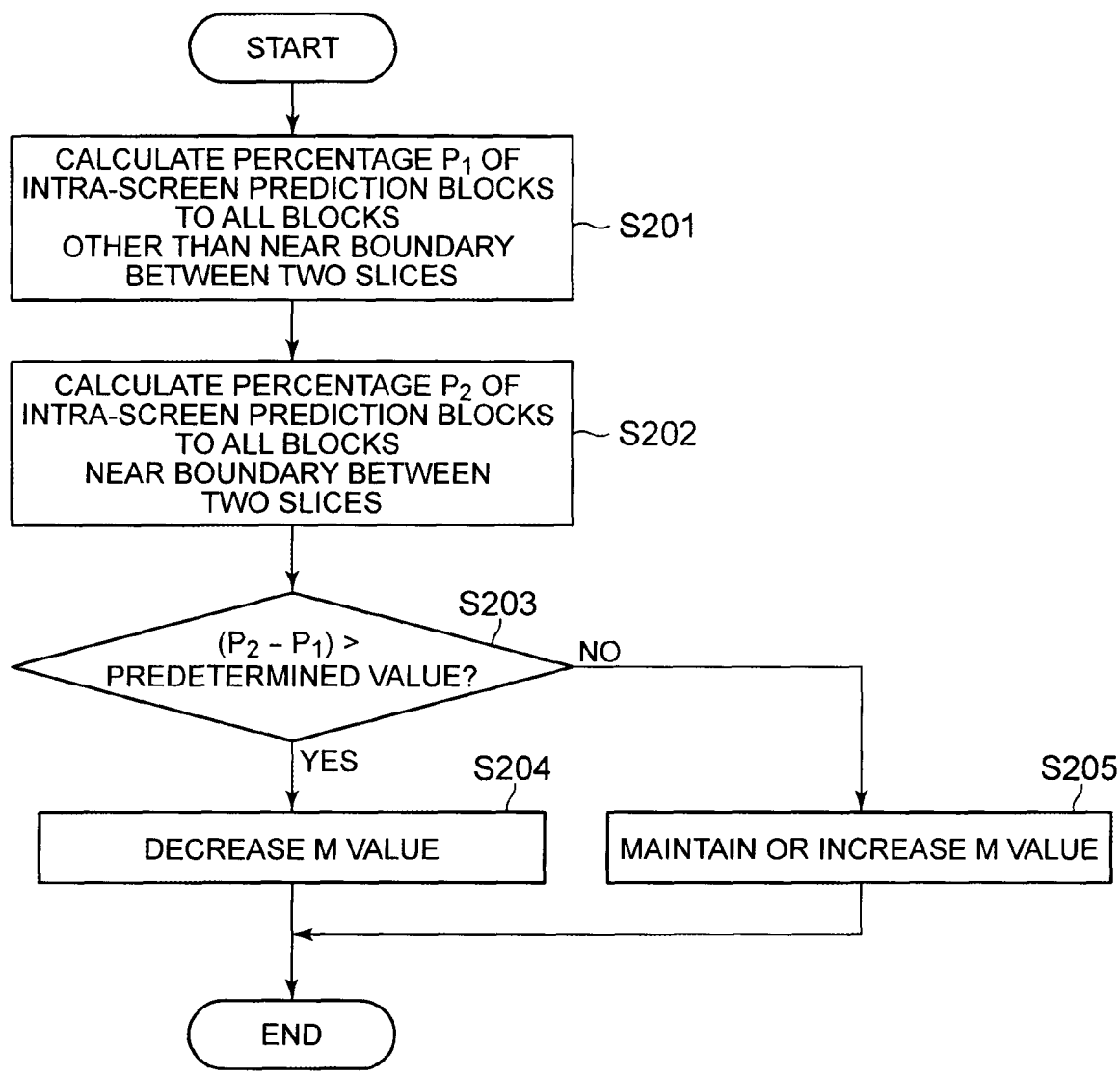
FIG. 4 is a flowchart depicting operation in example embodiment 2 of the video encoding device.

FIG. 4 is a flowchart depicting operation in example embodiment 2 of the video encoding device 100 depicted in FIG. 1.

The analysis section 111 analyzes the past encoding result (e.g. the encoding result of the immediately preceding frame) stored in the buffer 105. In detail, the analysis section 111 calculates a percentage $P_1$ of blocks for which intra prediction (intra-screen prediction) is used, to all blocks (e.g. prediction units (PU)) in the range other than the slice boundary (step S201). The analysis section 111 also calculates a percentage $P_2$ of blocks for which intra prediction is used, to all blocks near the slice boundary (step S202). In example embodiment 2, the encoding statistical information is the prediction modes (specifically, the number of intra prediction blocks) of blocks near the slice boundary, and the analysis result is the percentage $P_1$ and the percentage $P_2$.

The determination section 112 compares the percentage $P_1$ and the percentage $P_2$, and determines the degree of their difference. In detail, the determination section 112 determines whether or not the percentage $P_2$ is considerably high as compared with the percentage $P_1$. For example, the determination section 112 determines whether or not the difference between the percentage $P_2$ and the percentage $P_1$ is greater than a predetermined value (step S203).

The M value decision section 113 decreases the M value, in the case where the difference between the percentage $P_2$ and the percentage $P_1$ is greater than the predetermined value (step S204). Here, a plurality of predetermined values may be provided. In this case, for example, the M value may be decreased by a plurality of levels if the difference is greater than a first predetermined value, and decreased by one level if the difference is greater than a second predetermined value (<first predetermined value).

The M value decision section 113 maintains or increases the M value, in the case where the difference between the percentage $P_2$ and the percentage $P_1$ is not greater than the predetermined value (step S205). For example, the M value decision section 113 increases the M value if the difference is not greater than a third predetermined value (<second predetermined value), and maintains the M value if the difference is greater than the third predetermined value.

The control of the video encoding device in example embodiment 2 is based on the following concept.

Upon encoding each block in a screen, the encoding section 101 can use any of intra prediction and inter prediction, as a prediction mode. It is considered that, when the video is video of a scene in which the whole screen moves fast, the generation ratio in number of motion vectors large in value is high near the slice boundary, too, when inter prediction is used (in the case where there is no motion vector restriction). Since there is the motion vector restriction, however, an optimum motion vector (large motion vector) cannot be generated near the slice boundary, and as a result intra prediction is frequently used near the slice boundary. Other than near the slice boundary, on the other hand, intra prediction is not frequently used as compared with near the slice boundary, because there is no motion vector restriction.

Therefore, in the case where the difference between the percentage $P_1$ and the percentage $P_2$ is significant, it is estimated that a video signal of a fast moving scene is input to the encoding section 101.

In the case where the video is video of a fast moving scene, there is a possibility that an optimum motion vector is not selected near the slice boundary. Hence, estimating that the video is video of a fast moving scene is equivalent to that the difference between the percentage $P_1$ and the percentage $P_2$ is significant under the motion vector restriction.

As a predetermined value for determining whether or not the difference is significant, for example, such a value that, if used as a threshold, enables estimating there is a possibility that an optimum motion vector is not selected near the slice boundary is selected empirically or experimentally.

Example Embodiment 3

Figure 5:
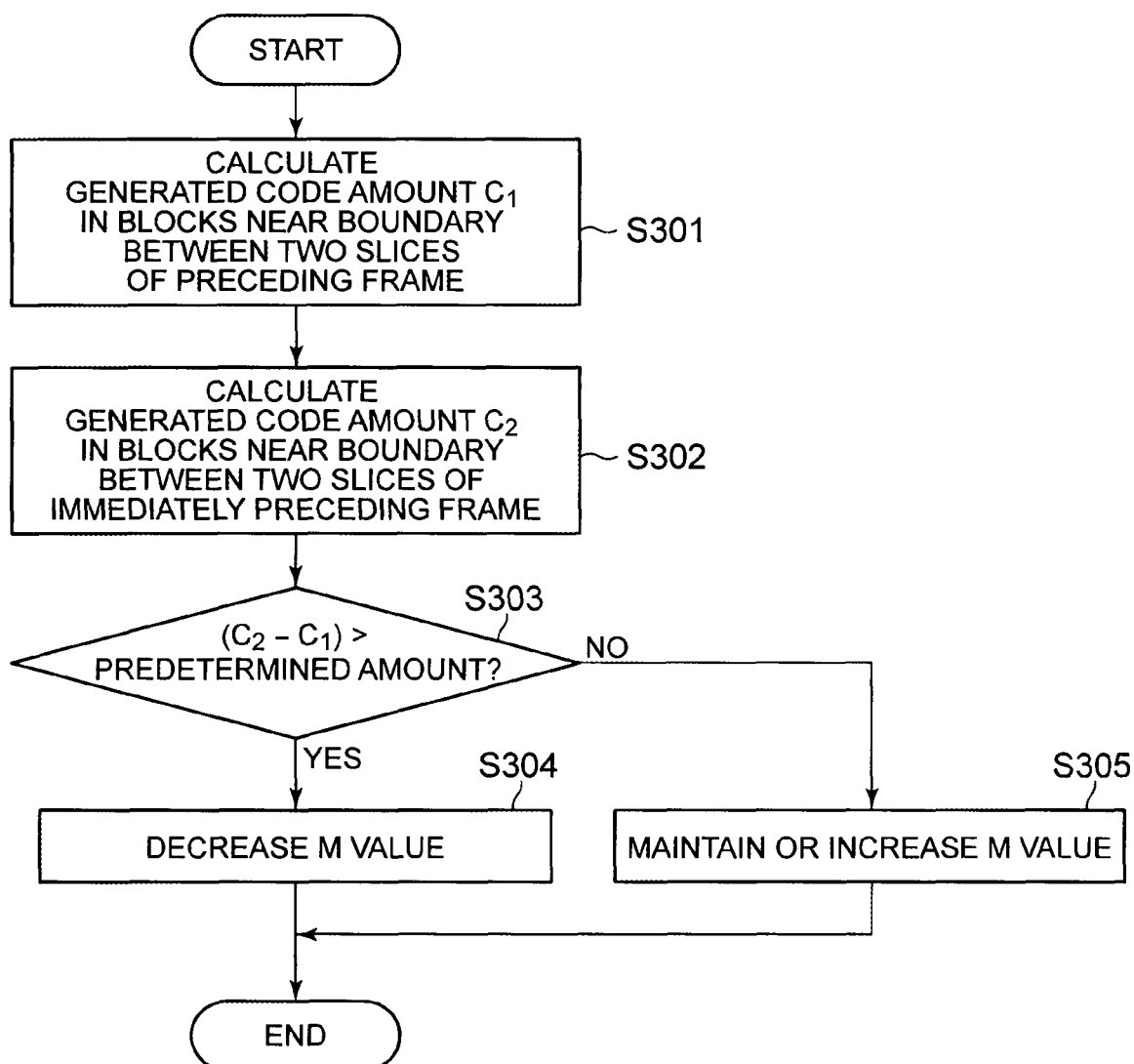
FIG. 5 is a flowchart depicting operation in example embodiment 3 of the video encoding device.

FIG. 5 is a flowchart depicting operation in example embodiment 3 of the video encoding device 100 depicted in FIG. 1.

The analysis section 111 analyzes the past encoding result (e.g. the encoding result of the immediately preceding frame) stored in the buffer 105. In detail, the analysis section 111 calculates a generated code amount $C_1$ in blocks near the slice boundary of a preceding frame (e.g. a frame preceding the current frame to be encoded by two frames) (step S301). The analysis section 111 also calculates a generated code amount $C_2$ in blocks near the slice boundary of the immediately preceding frame (step S302). In example embodiment 3, the encoding statistical information is the generated code amount in blocks near the slice boundary, and the analysis result is the generated code amount $C_1$ and the generated code amount $C_2$.

The determination section 112 compares the generated code amount $C_1$ and the generated code amount $C_2$, and determines the degree of their difference. In detail, the determination section 112 determines whether or not the generated code amount $C_2$ is considerably large as compared with the generated code amount $C_1$. For example, the determination section 112 determines whether or not the difference between the generated code amount $C_2$ and the generated code amount $C_1$ is greater than a predetermined amount (step S303).

The M value decision section 113 decreases the M value, in the case where the difference between the generated code amount $C_2$ and the generated code amount $C_1$ is greater than the predetermined amount (step S304). Here, a plurality of predetermined amounts may be provided. In this case, for example, the M value may be decreased by a plurality of levels if the difference is greater than a first predetermined amount, and decreased by one level if the difference is greater than a second predetermined amount (<first predetermined amount).

The M value decision section 113 maintains or increases the M value, in the case where the difference between the generated code amount $C_2$ and the generated code amount $C_1$ is not greater than the predetermined amount (step S305). For example, the M value decision section 113 increases the M value if the difference is not greater than a third predetermined amount (<second predetermined amount), and maintains the M value if the difference is greater than the third predetermined amount.

The control of the video encoding device in example embodiment 3 is based on the following concept.

As mentioned earlier, it is considered that, when the video is video of a scene in which the whole screen moves fast, the ratio in number of motion vectors large in value is high near the slice boundary, too, when inter prediction is used (in the case where there is no motion vector restriction). Since there is the motion vector restriction, however, an optimum motion vector (large motion vector) cannot be generated near the slice boundary, and as a result intra prediction is frequently used near the slice boundary. Typically, large code amount is generated when intra prediction is used, as compared with when inter prediction is used.

Therefore, in the case where the generated code amount $C_2$ is considerably large as compared with the generated code amount $C_1$, it is estimated that the situation has changed to such a situation where a video signal of a fast moving scene is input to the encoding section 101.

In the case where the video has become video of a fast moving scene, there is a possibility that an optimum motion vector is not selected near the slice boundary. Hence, estimating that the video has become video of a fast moving scene is equivalent to that the generated code amount $C_2$ has increased significantly under the motion vector restriction.

As a predetermined amount for determining whether or not the generated code amount has increased significantly, for example, such an amount that, if used as a threshold, enables estimating there is a possibility that an optimum motion vector is not selected near the slice boundary is selected empirically or experimentally.

As described above, in each of the foregoing example embodiments, the M value is adaptively changed based on the past encoding result (encoding statistical information). It is estimated whether or not an optimum motion vector (i.e. a motion vector not within the motion vector restriction) is selectable near the slice boundary under the motion vector restriction based on the encoding statistical information. In the case where it is estimated that the optimum motion vector is not selectable, the M value is changed to a smaller value. In the case where it is estimated that the optimum motion vector is selectable, the M value is maintained or changed to a larger value, on the ground that the optimum motion vector is selectable near the slice boundary under the motion vector restriction even with the current M value.

Thus, such a state where the optimum motion vector is not selectable near the slice boundary due to the motion vector restriction can be avoided as much as possible. This reduces the possibility of local image quality degradation. Since the M value is adaptively changed depending on the speed of movement, favorable image quality can be attained.

Moreover, since the M value is changed based on the encoding result (e.g. the encoding result of the immediately preceding frame), there is no need for pre-analysis (analysis performed as preprocessing when encoding the current frame). This prevents an increase in processing time for encoding, as compared with the case where pre-analysis is performed.

In the video encoding device 100, the analysis section 111, the determination section 112, and the M value decision section 113 may be configured so as to incorporate any two or all of example embodiments 1 to 3.

In the video encoding device 100, the M value decision section 113 may also decide the encoding structure using SDR/HDR switching information set from outside, and the entropy encoder 107 may transmit the SDR/HDR switching information to the video decoding device.

In detail, the M value decision section 113 controls the M value so that the encoding sequence (CVS) is terminated at the position (time position) of SDR/HDR switching set from outside.

Let fNumSwitch be the number of frames from a frame at the current time position to a frame at the switching time position, and M be a provisionally decided M value, for simplicity's sake.

When fNumSwitch is greater than or equal to 1 and M is greater than fNumSwitch, the M value decision section 113 updates M to be a value not greater than fNumSwitch.

When fNumSwitch is 0 in other cases, the M value decision section sets M to 1 so that CVS is terminated in a previously encoded frame. In other words, the video encoding device compresses the current frame as an IDR picture. Further, the entropy encoder 107 sets information of switched SDR or HDR in transfer_characteristics syntax of VUI of SPS of the IDR picture, in order to transmit SDR/HDR switching information to the video decoding device. For example, in the case of switching to HDR of HLG, 18 is set in transfer_characteristics syntax. In the case of switching to HDR of PQ, 16 is set in transfer_characteristics syntax. In the case of switching to SDR of Rec. ITU-R BT.2020, 14 is set in transfer_characteristics syntax. In the case of switching to SDR of IEC 61966-2-4, 11 is set in transfer_characteristics syntax. In the case of switching to SDR of Rec. ITU-R BT.709, 1 is set in transfer_characteristics syntax. Here, the entropy encoder 107 may output an EOS bitstream before the bitstream of the IDR picture.

In other cases, the M value decision section 113 outputs M as it is.

The relationship between the value and property of transfer_characteristics syntax corresponding to SDR or HDR mentioned above is shown in the following table.

TABLE 1

Value and property of transfer_characteristics of VUI

| Value | Property | Remarks |
|---|---|---|
| 1 | $V = \alpha * L_c^{0.45} - (\alpha - 1)$ for $1 >= L_c >= \beta$<br>$V = 4.500 * L_c$ for $\beta > L_c >= 0$ | Rec. ITU-R BT.709 |
| 11 | $V = \alpha * L_c^{0.45} - (\alpha - 1)$ for $L_c >= \beta$<br>$V = 4.500 * L_c$ for $\beta > L_c > -\beta$<br>$V = -\alpha * (-L_c)0.45 + (\alpha - 1)$ for $-\beta >= L_c$ | IEC 61966-2-4 |
| 14 | $V = \alpha * L_c 0.45 - (\alpha - 1)$ for $1 >= L_c >= \beta$<br>$V = 4.500 * L_c$ for $\beta > L_c >= 0$ | Rec. ITU-R BT.2020, 10-bit |
| 16 | $V = ((c_1 + c_2 * L_c n) \div (1 + c_3 * L_c n))m$ for all values of $L_c$<br>$c_1 = c_3 - c_2 + 1 = 3424 \div 4096 = 0.8359375$<br>$c_2 = 32 * 2413 \div 4096 = 18.8515625$<br>$c_3 = 32 * 2392 \div 4096 = 18.6825$<br>$m = 128 * 2523 \div 4096 = 78.84375$<br>$n = 0.25 * 2610 \div 4096 = 0.1593017578125$<br>for which $L_c$ equal to 1 for peak white is ordinarily intended to correspond to a display luminance level of 10 000 candelas per square metre | SMPTE ST 2084 |
| 18 | $V = 0.5 * L_c^{0.5}$ for $1 >= L_c >= 0$<br>$V = a * Ln(L_c - b) + c$ for $L_c > 1$<br>$a = 0.17883277, b = 0.28466892, c = 0.55991073$ | ARIB STD-B67 |

The video decoding device depicted in FIG. 2 decodes the bitstream encoded using the M value set in the range satisfying the motion vector restriction as described in example embodiments 1 to 3.

The video decoding device depicted in FIG. 2 can also receive the SDR/HDR switching information transmitted from the video encoding device, by decoding the bitstream.

In detail, the entropy decoder 202 in the video decoding device can receive the SDR/HDR switching information, by decoding the value of transfer_characteristics syntax of VUI of SPS. For example, in the case where transfer_characteristics syntax is 18, the entropy decoder 202 receives switching to HDR of HLG In the case where transfer_characteristics syntax is 16, the entropy decoder 202 receives switching to HDR of PQ. In the case where transfer_characteristics syntax is 14, the entropy decoder 202 receives switching to SDR of Rec. ITU-R BT.2020. In the case where transfer_characteristics syntax is 11, the entropy decoder 202 receives switching to SDR of IEC 61966-2-4. In the case where transfer_characteristics syntax is 1, the entropy decoder 202 receives switching to Rec. ITU-R BT.709. Here, SDR/HDR switching is received (detected) merely by decoding SPS of the IDR picture encoded with M=1. An EOS bitstream may be received (detected) before the IDR bitstream.

A reception terminal using the video decoding device described above can obtain SDR/HDR switching information, and adjust video display according to the property of the video signal. Thus, video display without image quality degradation can be realized while supporting SDR/HDR switching display.

Figure 6:
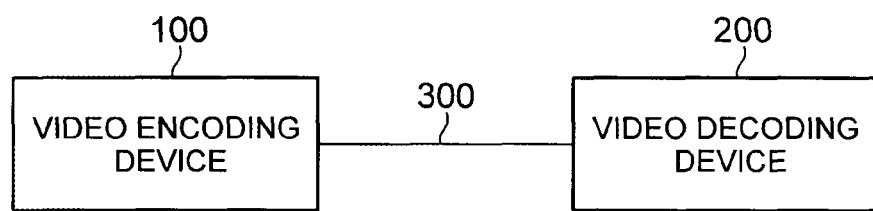
FIG. 6 is a block diagram depicting an example of a video system.

FIG. 6 is a block diagram depicting an example of a video system. The video system depicted in FIG. 6 is a system in which the video encoding device 100 in each of the foregoing example embodiments and the video decoding device 200 depicted in FIG. 2 are connected by a wireless transmission path or wired transmission path 300. The video encoding device 100 is the video encoding device 100 in any of the foregoing example embodiments 1 to 3. In the video encoding device 100, the analysis section 111, the determination section 112, and the M value decision section 113 may be configured to perform processes according to any two or all of example embodiments 1 to 3.

In the above-mentioned example, transmission means for transmitting SDR/HDR switching information to the video decoding side is realized by the entropy encoder 107, and decoding means for decoding encoded video and SDR/HDR switching information transmitted from the video encoding side is realized by the entropy decoder 202. However, in the case where an entropy encoder for performing entropy encoding is separate from a multiplexer for multiplexing encoded data generated by the entropy encoder and SDR/HDR switching information and an entropy decoder for performing entropy decoding is separate from a de-multiplexer for de-multiplexing SDR/HDR switching information and video from a multiplexed bitstream, the video system may be a system that includes a video encoding device composed of parts not including a multiplexer and a video decoding device composed of parts not including a de-multiplexer.

Figure 7:
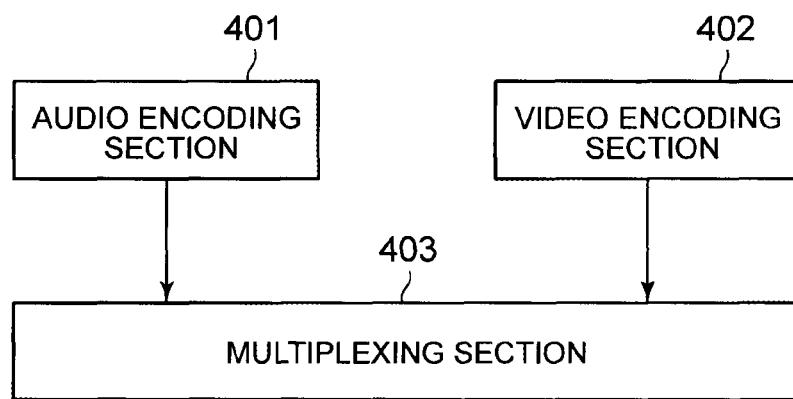
FIG. 7 is a block diagram depicting another example of the video system.

FIG. 7 is a block diagram depicting another example of the video system. The video system depicted in FIG. 7 includes an audio encoding section 401, a video encoding section 402, and a multiplexing section 403.

The audio encoding section 401 encodes, from among data (content) including video and audio, an audio signal based on, for example, the MPEG-4 AAC (Advanced Audio Coding) standard or the MPEG-4 ALS (Audio Lossless Coding) standard defined in the ARIB STD-B32 standard, to generate and output an audio bitstream.

The video encoding section 402 is configured as depicted in FIG. 1 as an example, to generate and output a video bitstream.

The multiplexing section 403 multiplexes the audio bitstream, the video bitstream, and other information based on, for example, the ARIB STD-B32 standard, to generate and output a bitstream.

Each of the foregoing example embodiments may be realized by hardware, or realized by a computer program.

Figure 8:
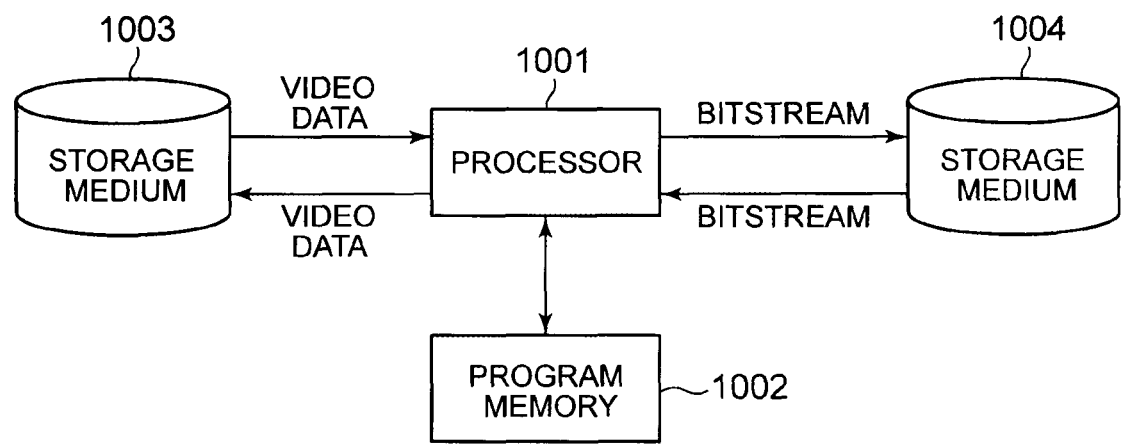
FIG. 8 is a block diagram depicting a structural example of an information processing system that can realize the functions of the video encoding device and video decoding device.

An information processing system depicted in FIG. 8 includes a processor 1001, a program memory 1002, a storage medium 1003 for storing video data, and a storage medium 1004 for storing a bitstream. The storage medium 1003 and the storage medium 1004 may be separate storage media, or storage areas included in the same storage medium. A magnetic storage medium such as a hard disk may be used as a storage medium.

In the information processing system depicted in FIG. 8, a program (video encoding program or video decoding program) for realizing the functions of the blocks (except the buffer block) depicted in FIG. 1 or 2 is stored in the program memory 1002. The processor 1001 realizes the functions of the video encoding device depicted in FIG. 1 or the video decoding device depicted in FIG. 2, by executing processes according to the program stored in the program memory 1002.

Figure 9:
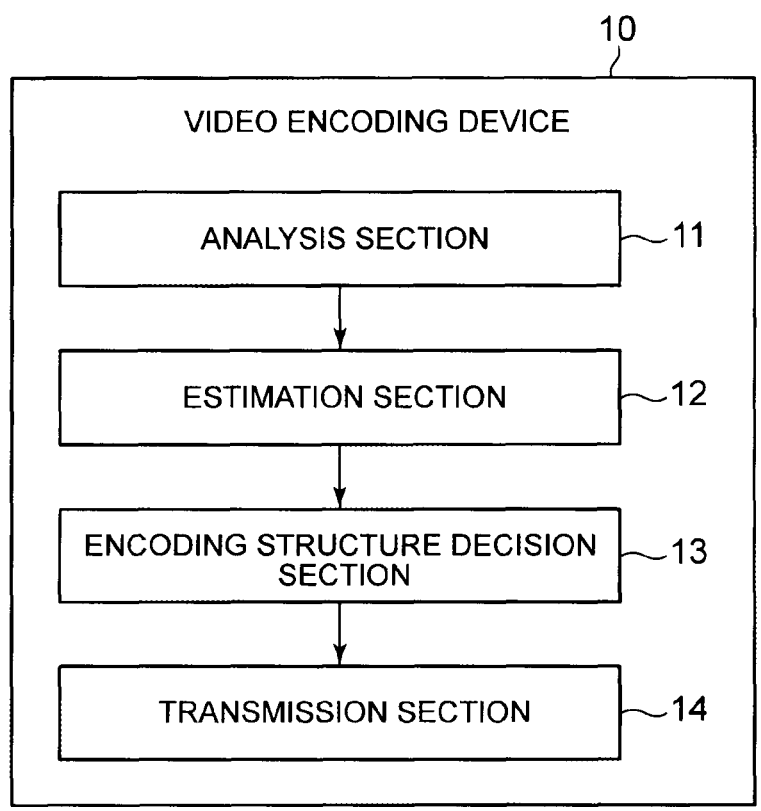
FIG. 9 is a block diagram depicting main parts of the video encoding device.

FIG. 9 is a block diagram depicting main parts of a video encoding device. As depicted in FIG. 9, a video encoding device 10 includes: an analysis section 11 (corresponding to the analysis section 111 in the example embodiments) for analyzing encoding statistical information; an estimation section 12 (realized by the determination section 112 in the example embodiments) for estimating whether or not an optimum motion vector is selectable near a slice boundary, based on an analysis result of the analysis section 11; an encoding structure decision section 13 (realized by the M value decision section 113 in the example embodiments) for adaptively deciding an encoding structure as any of an SOP structure composed of only a picture or pictures whose Temporal ID are 0, an SOP structure composed of a picture or pictures whose Temporal ID are 0 and a picture or pictures whose Temporal ID are 1, an SOP structure composed of a picture or pictures or pictures whose Temporal ID is 0, a picture or pictures whose Temporal ID are 1, and a picture or pictures whose Temporal ID are 2, and an SOP structure composed of a picture or pictures whose Temporal ID are 0, a picture or pictures whose Temporal ID are 1, a picture or pictures whose Temporal ID are 2, and a picture or pictures whose Temporal ID are 3, based on an estimation result of the estimation section 12 and SDR/HDR switching information; and a transmission section 14 (realized by the entropy encoder 107 in the example embodiments) for transmitting the SDR/HDR switching information to a video decoding side.

Figure 10:
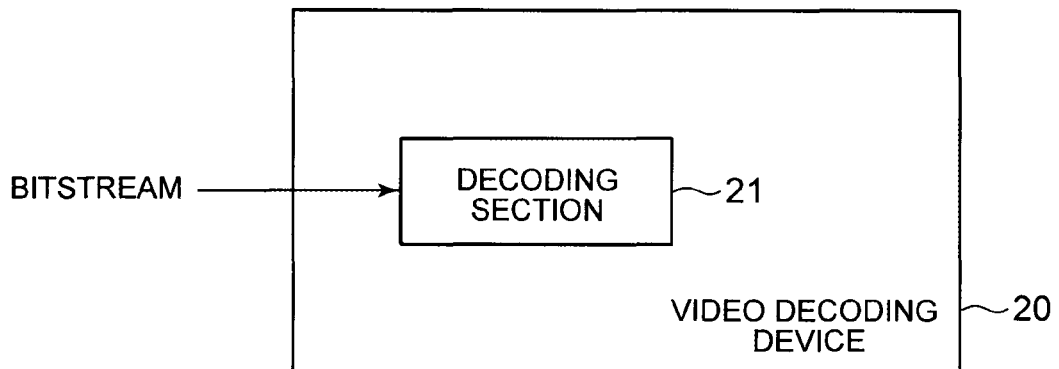
FIG. 10 is a block diagram depicting main parts of the video decoding device.

FIG. 10 is a block diagram depicting main parts of a video decoding device. As depicted in FIG. 10, a video decoding device 20 includes a decoding section 21 (realized by the entropy decoder 202 in the example embodiments) for decoding video encoded with any of an SOP structure composed of only a picture whose Temporal ID is 0, an SOP structure composed of a picture whose Temporal ID is 0 and a picture whose Temporal ID is 1, an SOP structure composed of a picture whose Temporal ID is 0, a picture whose Temporal ID is 1, and a picture whose Temporal ID is 2, and an SOP structure composed of a picture whose Temporal ID is 0, a picture whose Temporal ID is 1, a picture whose Temporal ID is 2, and a picture whose Temporal ID is 3, and SDR/HDR switching information transmitted from a video encoding side.

The decoding section 21 can decode a bitstream encoded based on, as the set encoding structure, any of an SOP structure composed of only a picture whose Temporal ID is 0, an SOP structure composed of a picture whose Temporal ID is 0 and a picture whose Temporal ID is 1, an SOP structure composed of a picture whose Temporal ID is 0, a picture whose Temporal ID is 1, and a picture whose Temporal ID is 2, and an SOP structure composed of a picture whose Temporal ID is 0, a picture whose Temporal ID is 1, a picture whose Temporal ID is 2, and a picture whose Temporal ID is 3.

Figure 12:
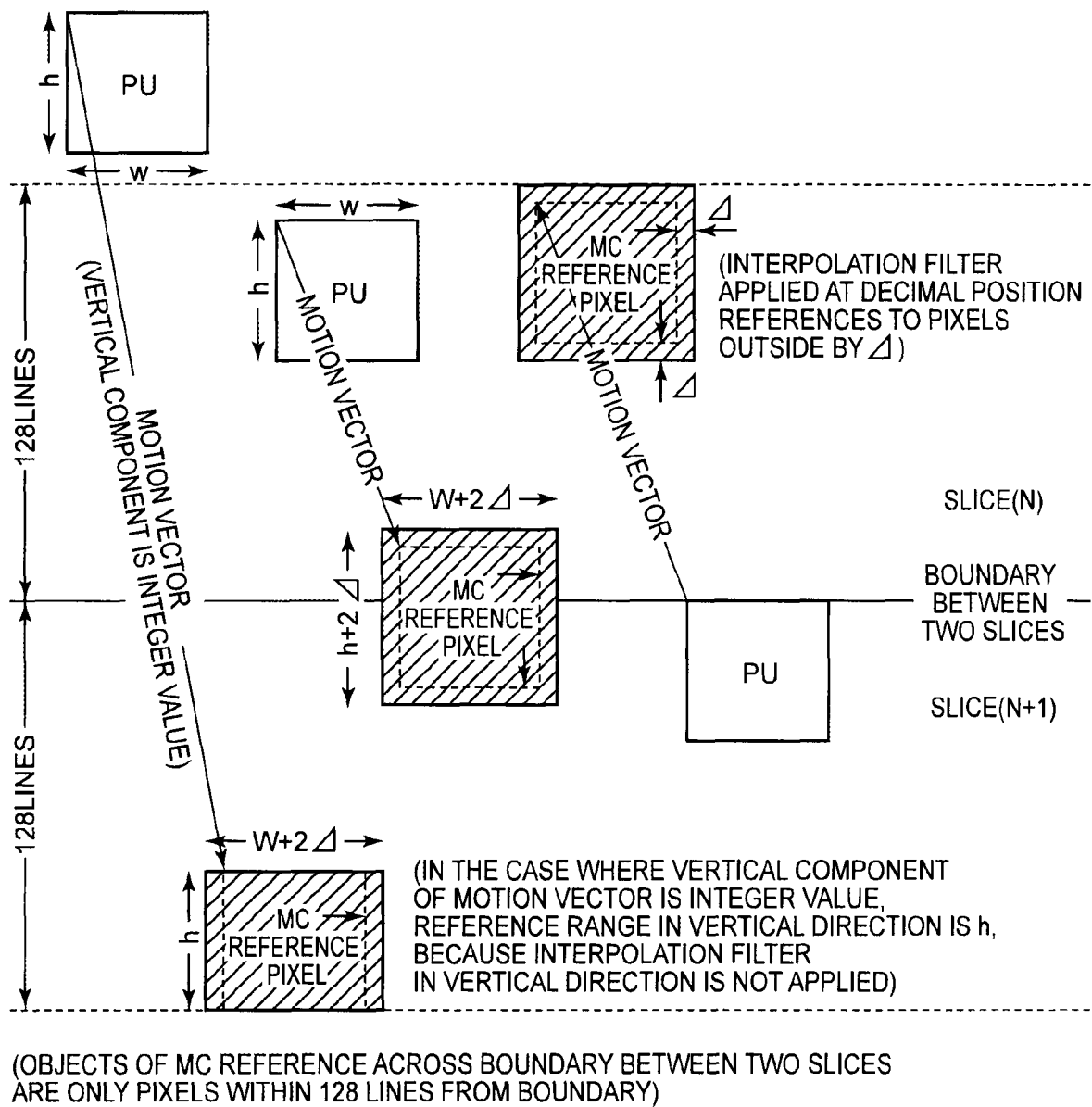
FIG. 12 is an explanatory diagram depicting a motion vector restriction.

Further, in the case where a screen is divided into four slices as depicted in FIG. 11 and a PU of one slice motion compensation (MC) references to another slice as depicted in FIG. 12, the decoding section 21 can decode a bitstream encoded under a restriction that MC reference by the same PU across a slice boundary references to only pixels within 128 lines from the slice boundary.

Figure 13:
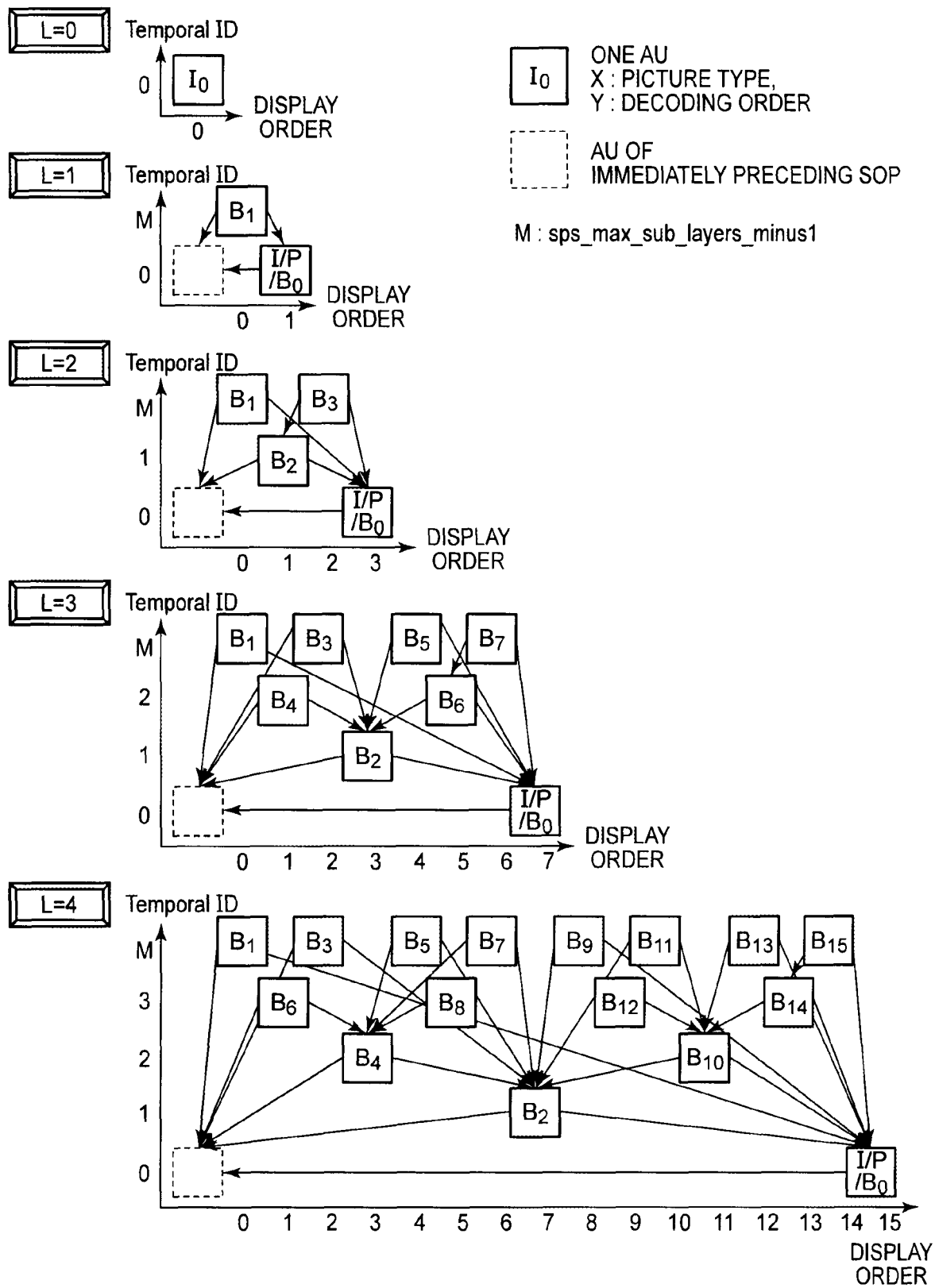
FIG. 13 is an explanatory diagram depicting SOP structures.
Figure 14:
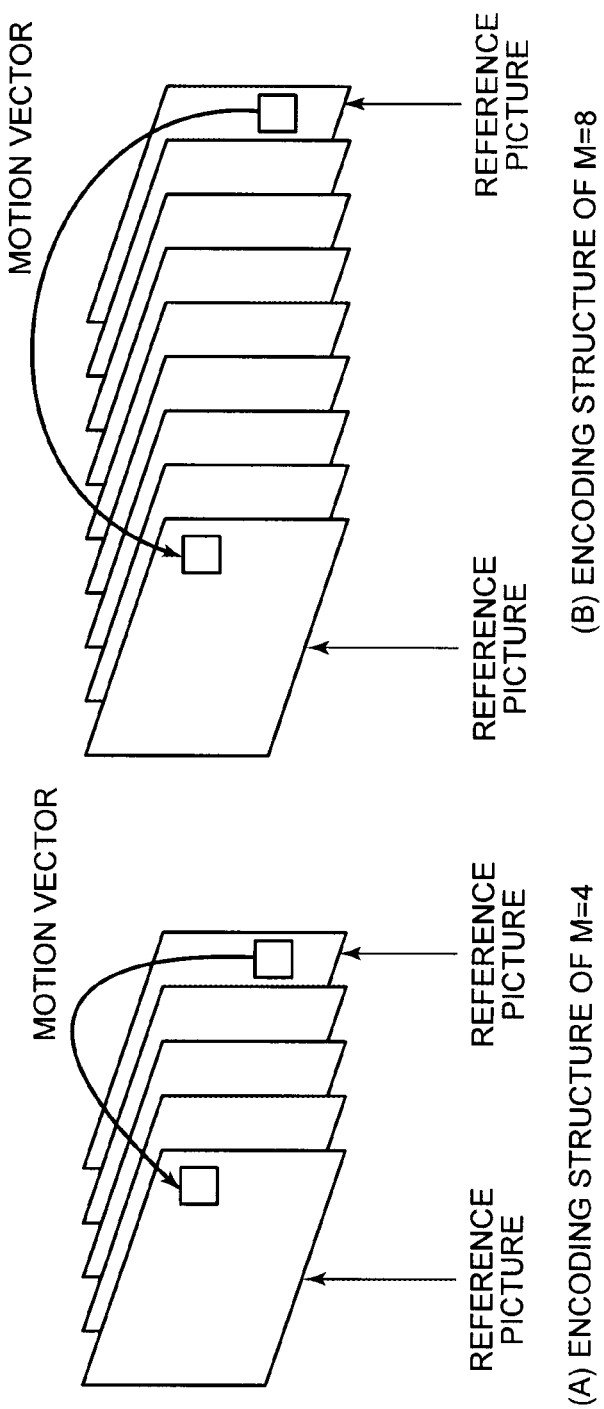
FIG. 14 is an explanatory diagram depicting an example of a reference picture interval.
Figure 15:
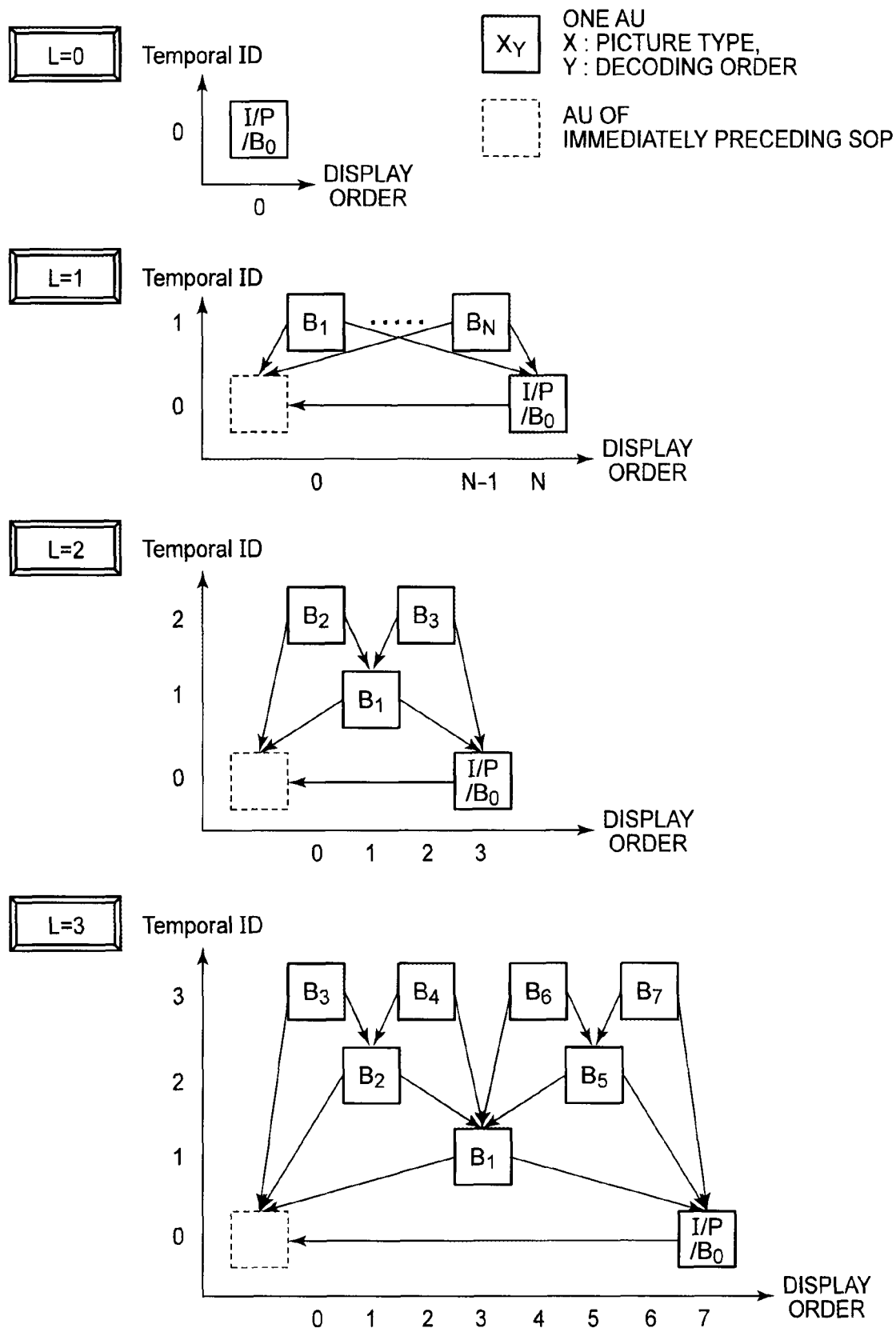
FIG. 15 is an explanatory diagram depicting SOP structures.

In the example embodiments, in the case of handling a 120P moving image, the following SOP structures as depicted in FIG. 13 may be used on the video encoding and decoding sides.

Structure of L=0: SOP structure composed of only a picture or pictures whose Temporal ID are 0 (i.e. the number of rows of picture included in the same SOP is 1. In other words, L indicating maximum Temporal ID is 0.)

Structure of L=1: SOP structure composed of a picture or pictures whose Temporal ID are 0 and a picture or pictures whose Temporal ID are 1 (or M) (i.e. the number of rows of picture included in the same SOP is 2. In other words, L indicating maximum Temporal ID is 1 (or M).)

Structure of L=2: SOP structure composed of a picture or pictures whose Temporal ID are 0, a picture or pictures whose Temporal ID are 1, and a picture or pictures whose Temporal ID are 2 (or M) (i.e. the number of rows of picture included in the same SOP is 3. In other words, L indicating maximum Temporal ID is 2 (or M).)

Structure of L=3: SOP structure composed of a picture or pictures whose Temporal ID are 0, a picture or pictures whose Temporal ID are 1, a picture or pictures whose Temporal ID are 2, and a picture or pictures whose Temporal ID are 3 (or M) (i.e. the number of rows of picture included in the same SOP is 4. In other words, L indicating maximum Temporal ID is 3 (or M).)

Structure of L=4: SOP structure composed of a picture or pictures whose Temporal ID are 0, a picture or pictures whose Temporal ID are 1, a picture or pictures whose Temporal ID are 2, a picture or pictures whose Temporal ID are 3, and a picture or pictures whose Temporal ID are 4 (or M) (i.e. the number of rows of picture included in the same SOP is 5. In other words, L indicating maximum Temporal ID is 5 (or M).)

Although the present invention has been described with reference to the example embodiments and examples, the present invention is not limited to the foregoing example embodiments and examples. Various changes understandable by those skilled in the art can be made to the structures and details of the present invention within the scope of the present invention.

This application claims priority based on Japanese Patent Application No. 2015-235525 filed on Dec. 2, 2015, the disclosure of which is incorporated herein in its entirety.

REFERENCE SIGNS LIST 10 video encoding device
11 analysis section
12 estimation section
13 encoding structure decision section
14 transmission section
20 video decoding device
21 decoding section
100 video encoding device
101 encoding section
102 screen divider
103 frequency transformer/quantizer
104 inverse quantizer/inverse frequency transformer
105 buffer
106 predictor
107 entropy encoder
111 analysis section
112 determination section
113 M value decision section
200 video decoding device
202 entropy decoder
203 inverse quantizer/inverse frequency transformer
204 predictor
205 buffer
401 audio encoding section
402 video encoding section
403 multiplexing section
1001 processor
1002 program memory
1003, 1004 storage medium

The invention claimed is:

1. A video encoding method comprising:
setting, in transfer characteristics syntax of VUI (Video Usability Information) of each SPS (Sequence Parameter Set) in a bitstream comprising a video signal, information related to dynamic range of the video signal,
wherein a value corresponding to characteristics specified by ITU-R BT709 equal to 1 is set in the transfer characteristics syntax when the dynamic range of the video signal is SDR (Standard Dynamic Range),
wherein a value corresponding to one of characteristics specified by HLG (Hybrid Log Gamma) equal to 18 or PQ (Perceptual Quantizer) equal to 16 is set in the transfer characteristics syntax when the dynamic range of the video signal is HDR (High Dynamic Range), and
wherein all pictures in the bitstream have at least Temporal ID equal to 0.

2. A video encoding device comprising:
transmission section, implemented by a hardware including at least one processor, which sets, in transfer characteristics syntax of VUI (Video Usability Information) of each SPS (Sequence Parameter Set) in a bitstream comprising a video signal, information related to dynamic range of the video signal,
wherein the transmission section sets a value corresponding to characteristics specified by ITU-R BT709 to a value equal to 1 in the transfer characteristics syntax when the dynamic range of the video signal is SDR (Standard Dynamic Range),
wherein the transmission section sets a value corresponding to one of characteristics specified by HLG (Hybrid Log Gamma) to a value equal to 18 or PQ (Perceptual Quantizer) to a value equal to 16 in the transfer characteristics syntax when the dynamic range of the video signal is HDR (High Dynamic Range), and
wherein all pictures in the bitstream have at least Temporal ID equal to 0.

3. A non-transitory computer readable information recording medium storing a video encoding program, when executed by a processor, performs:
setting, in transfer characteristics syntax of VUI (Video Usability Information) of each SPS (Sequence Parameter Set) in a bitstream comprising a video signal, information related to dynamic range of the video signal,
wherein a value corresponding to characteristics specified by ITU-R BT709 equal to 1 is set in the transfer characteristics syntax when the dynamic range of the video signal is SDR (Standard Dynamic Range),
wherein a value corresponding to one of characteristics specified by HLG (Hybrid Log Gamma) equal to 18 or PQ (Perceptual Quantizer) equal to 16 is set in the transfer characteristics syntax when the dynamic range of the video signal is HDR (High Dynamic Range), and
wherein all pictures in the bitstream have at least Temporal ID equal to 0.

4. A video decoding method comprising:
obtaining a video signal from a bitstream including information related to dynamic range of the video signal in transfer characteristics syntax of VUI (Video Usability Information) of each SPS (Sequence Parameter Set) in the bitstream,
wherein a value corresponding to characteristics specified by ITU-R BT709 equal to 1 is set in the transfer characteristics syntax when the dynamic range of the video signal is SDR (Standard Dynamic Range),
wherein a value corresponding to one of characteristics specified by HLG (Hybrid Log Gamma) equal to 18 or PQ (Perceptual Quantizer) equal to 16 is set in the transfer characteristics syntax when the dynamic range of the video signal is HDR (High Dynamic Range), and
wherein all pictures in the bitstream have at least Temporal ID equal to 0.

5. A video decoding device comprising:
a decoding section, implemented by a hardware including at least one processor, which obtains a video signal from a bitstream including information related to dynamic range of the video signal in transfer characteristics syntax of VUI (Video Usability Information) of each SPS (Sequence Parameter Set) in the bitstream,
wherein a value corresponding to characteristics specified by ITU-R BT709 equal to 1 is set in the transfer characteristics syntax when the dynamic range of the video signal is SDR (Standard Dynamic Range),
wherein a value corresponding to one of characteristics specified by HLG (Hybrid Log Gamma) equal to 18 or PQ (Perceptual Quantizer) equal to 16 is set in the transfer characteristics syntax when the dynamic range of the video signal is HDR (High Dynamic Range), and wherein all pictures in the bitstream have at least Temporal ID equal to 0.

6. A non-transitory computer readable information recording medium storing a video decoding program, when executed by a processor, performs:

obtaining a video signal from a bitstream including information related to dynamic range of the video signal in transfer characteristics syntax of VUI (Video Usability Information) of each SPS (Sequence Parameter Set) in the bitstream, wherein a value corresponding to characteristics specified by ITU-R BT709 equal to 1 is set in the transfer characteristics syntax when the dynamic range of the video signal is SDR (Standard Dynamic Range), wherein a value corresponding to one of characteristics specified by HLG (Hybrid Log Gamma) equal to 18 or PQ (Perceptual Quantizer) equal to 16 is set in the transfer characteristics syntax when the dynamic range of the video signal is HDR (High Dynamic Range), and wherein all pictures in the bitstream have at least Temporal ID equal to 0.

\* \* \* \* \*